July 9, 1968  J. R. HALL  3,391,755
SILENCING SYSTEM WITH RESONATING ELEMENTS AT
ACOUSTIC WAVE ANTINODES
Filed April 27, 1965

INVENTOR.
James R. Hall
BY
J. L. Carpenter
ATTORNEY

United States Patent Office 3,391,755
Patented July 9, 1968

3,391,755
SILENCING SYSTEM WITH RESONATING ELEMENTS AT ACOUSTIC WAVE ANTINODES
James R. Hall, Detroit, Mich., assignor to General Motors Corporation, Detroit, Mich., a corporation of Delaware
Filed Apr. 27, 1965, Ser. No. 451,129
10 Claims. (Cl. 181—48)

This invention relates to silencing systems and is particularly directed to a system which will attenuate low frequency noise in an automotive exhaust system.

The standard automobile exhaust system includes an exhaust manifold and an exhaust pipe which form an exhaust line extending to a muffler and a tail pipe. Each of these components, when excited by noise at a certain frequency, will resonate to amplify the noise in a manner similar to an organ pipe. In an automobile, the dimensions of the exhaust line and tail pipe are such that they resonate in response to low frequency noise generated by firing of the engine at relatively low speeds. These noises are quite undesirable when so amplified, and the automotive industry has proposed many methods of attenuation. This invention provides an unusually simple and yet very effective method of eliminating such low frequency noises.

In most exhaust systems, the muffler separates the tail pipe from the exhaust line so that the exhaust line and tail pipe resonate at frequencies determined by their effective acoustic lengths. By this invention, the acoustic length of the exhaust line is made the same as the acoustic length of the tail pipe, the two being separated by a muffler. The engine noise at that frequency which would cause resonance of the exhaust line and tail pipe is then attenuated in the exhaust line so that no resonance occurs in the exhaust line. By completely attenuating the noise at the resonant frequency in the exhaust line, there is no noise at the resonant frequency of the tail pipe. Consequently, neither the exhaust line nor tail pipe amplifies the undesirable engine noise.

Figure 1:
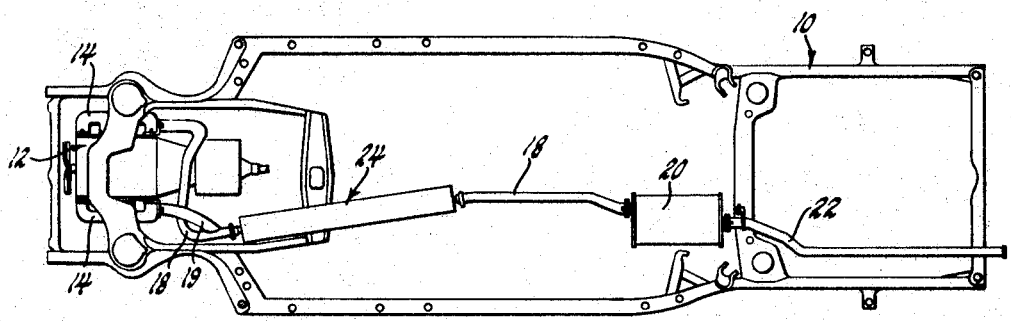
Figure 2:
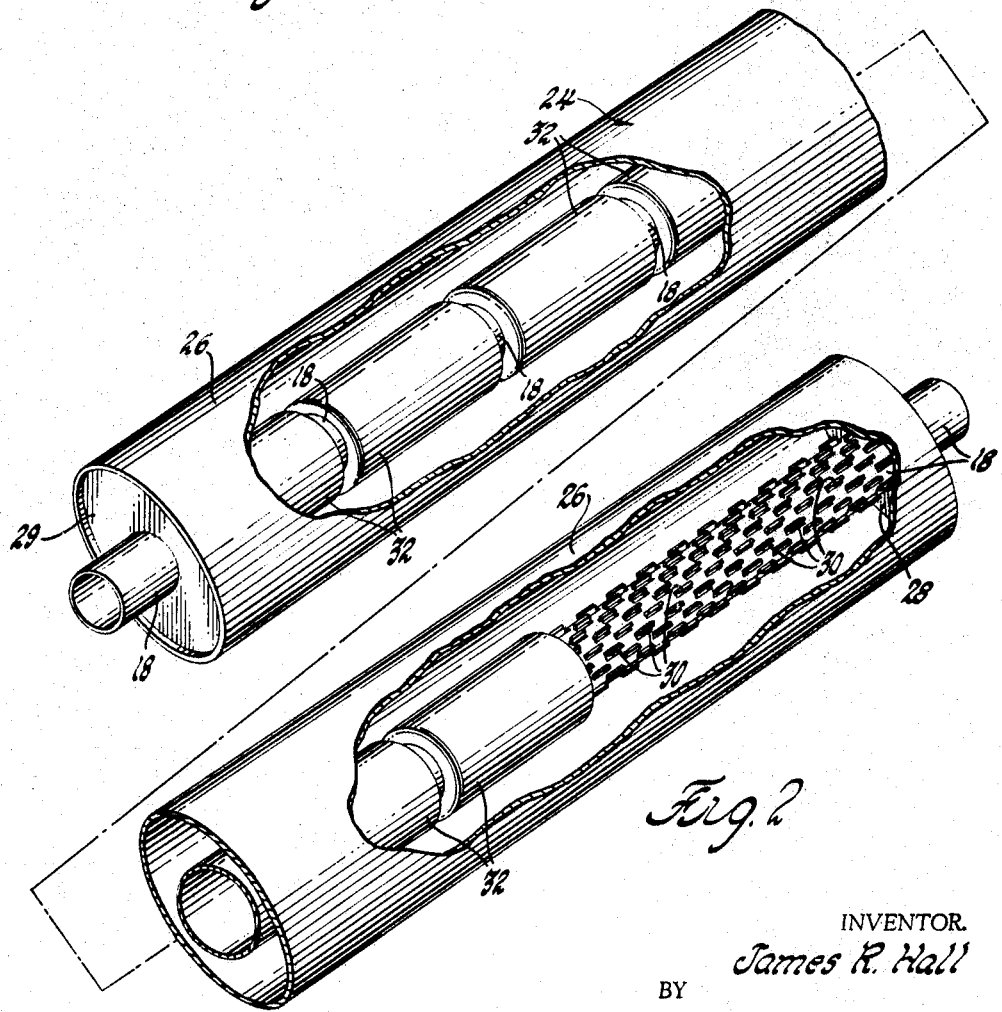

The details as well as other objects and advantages of this invention are disclosed in the following description and in the accompanying drawing in which:

FIGURE 1 is a bottom view of an automobile frame on which is mounted the silencing system of this invention; and FIGURE 2 is a perspective view of one embodiment of a device for attenuating the resonant frequencies of the exhaust line and the tail pipe, the two ends of the device being separated and disposed one above the other and having parts broken away for ease of illustration.

FIGURE 1 illustrates an automotive vehicle frame 10 which supports an engine 12 having exhaust manifolds 14. For the V-type engine illustrated, an exhaust pipe 18 includes a Y-shaped or cross-over pipe 19. Exhaust pipe 18 extends to a muffler 20, and a tail pipe 22 extends from the muffler 20 to the rear of the vehicle.

The exhaust manifolds 14 and exhaust pipe 18 form an exhaust line which has an acoustic length determined by the dimensions, such as length, of these parts and the properties, such as temperature, of the exhaust gases flowing therethrough. According to this invention, the muffler 20 is positioned between the exhaust pipe 18 and the tail pipe 22 so that the resonant frequency of the exhaust line equals the resonant frequency of the tail pipe 22.

When a fluid flow conduit such as the exhaust line resonates under excitation from noise at a certain frequency, a standing sound wave is formed. This standing wave has a node at the exhaust valve and a node at the juncture of the exhaust pipe 18 with the relatively large cross-sectional area of the expansion chamber formed by muffler 20. An antinode exists approximately midway of the exhaust line and generally within the exhaust pipe 18.

It is well-known that noise at the resonant frequency in a conduit may be attenuated by a resonating device located at the antinode of the standing sound wave. A closed tube having an acoustic length equal to one-half the length of the resonating conduit is often used for such purposes. By this invention, the use of only one such device is sufficient to attenuate the noise at the resonant frequencies of both the exhaust line and the tail pipe. By positioning the muffler 20 to equalize the resonant frequencies of the exhaust line and tail pipe, a device 24 may be incorporated in exhaust pipe 18 to eliminate all noise at this frequency.

One embodiment of device 24 is shown in greater detail in FIGURE 2. As illustrated, it comprises a casing 26 having closed ends 28 and 29. Casing 26 surrounds the exhaust pipe 18 which extends completely therethrough. A series of louvered openings 30 are formed in exhaust pipe 18 within casing 26 adjacent the end 28. These louvers 30 are formed at the antinode of the standing wave within the exhaust line, approximately at the midpoint of the exhaust line. The acoustic length of device 24 between louvers 30 and the opposite end 29 is one-half the acoustic length of the exhaust line. If desired, high frequency attenuating chambers 32 may be positioned about the remainder of exhaust pipe 18 within casing 26.

According to one theory of operation, the standing sound wave within the exhaust line excites device 24 to form a standing sound wave therein. The standing wave within device 24 has an antinode at louvers 30 and a node at the opposite end 29. This sound wave is reflected into the exhaust line with opposite phase but equal amplitude to the standing sound wave in the exhaust line, thereby completely attenuating the standing wave in the exhaust line and preventing propagation of noise at the frequency of the standing wave.

Since no noise at the resonant frequency of the exhaust line is emitted from the exhaust pipe, and since the resonant frequencies of the exhaust line and tail pipe are equal, there is no noise to excite the tail pipe at its resonant frequency. By this invention, propagation of noise at the resonant frequency of either the exhaust line or the tail pipe is totally prevented.

Having thus explained the invention, it will be readily appreciated by those skilled in the art that the tail pipe 22 may have an acoustic length such that it will support a resonant frequency equal to either the fundamental resonant frequency of the exhaust line or any of its odd harmonics. Any of these constructions will also very effectively attenuate noise at the resonant frequencies of the exhaust line and tail pipe.

I claim:

1. A fluid flow line subjected to a periodic exciting noise comprising a first conduit, an expansion chamber connected to the downstream end of said conduit, a second conduit connected to said expansion chamber, said first conduit having an acoustic length and a resonant frequency, said second conduit having a resonant frequency equal to one of the fundamental and odd harmonics of the resonant frequency of said first conduit, and a resonating chamber tuned to the resonant frequency of said first conduit, said resonating chamber being connected to said first conduit at the acoustic center of said first conduit whereby propagation of the resonant frequencies of said conduits is prevented.

2. The flow line of claim 1 wherein said resonating chamber is a tube having resonant frequencies equal to the fundamental and odd harmonics of the resonant frequency of said first conduit.

3. The flow line of claim 1 wherein said resonating chamber is a tube connected at one end to said first conduit, closed at the opposite end, and having resonant frequencies equal to the fundamental and odd harmonics of the resonant frequency of said first conduit.

4. The flow line of claim 1 wherein said resonating chamber is a tube connected at one end to said first conduit, closed at the opposite end, and having an acoustic length between said ends equal to one-half the acoustic length of said first conduit.

5. The flow line of claim 1 wherein said second conduit has a resonant frequency equal to the resonant frequency of said first conduit and wherein said resonating chamber is a tube connected at one end to said first conduit, closed at the opposite end, and having an acoustic length between said ends equal to one-half the acoustic length of the said first conduit.

6. A fluid flow line subjected to a periodic exciting noise comprising a first conduit, an expansion chamber connected to the downstream end of said first conduit, a second conduit connected to said expansion chamber, said first conduit having an acoustic length which resonates when there exists in said first conduit a standing wave of wavelength twice the acoustic length of said first conduit, said second conduit having an acoustic length which resonates at one of the fundamental and odd harmonics of the resonant frequency of said first conduit, and a resonating tube having an acoustic length equal to one-fourth the wavelength of said standing wave, said resonating tube being closed at one end and connected at the opposite end to said first conduit at the antinode of said standing wave whereby propagation of the resonant frequencies of said conduits is prevented.

7. A gas flow line subjected to a periodic exciting noise, said flow line having an acoustic length, comprising an expansion chamber located at the acoustic center of said flow line to divide said flow line into two conduits of equal acoustic length, and a resonating tube having an acoustic length equal to one-half the acoustic length of said conduits, said resonating tube being connected to one of said conduits at the acoustic center of said conduit whereby propagation of the resonant frequency of said conduits is prevented.

8. The flow line of claim 7 wherein said expansion chamber isolates said second conduit from said first conduit.

9. The flow line of claim 8 wherein said flow line is an internal combustion engine exhaust system.

10. An automotive engine exhaust system comprising an exhaust conduit including an exhaust manifold and an exhaust pipe connected at one end to said manifold, said conduit having an acoustic length and a resonant frequency, a muffler connected to said conduit at the opposite end of said exhaust pipe, a tail pipe connected to said muffler and isolated from said exhaust conduit by said muffler, said tail pipe having a resonant frequency equal to the resonant frequency of said exhaust conduit, and a side branch resonating tube having an acoustic length equal to one-half the acoustic length of said exhaust conduit, said resonating tube being connected to said exhaust pipe at the acoustic center of said exhaust conduit whereby propagation of the resonant frequency of the exhaust conduit and tail pipe is prevented.

References Cited
UNITED STATES PATENTS

| 1,910,672 | 5/1933 | Bourne | 181—48 |
| 2,099,887 | 11/1937 | Heath | 181—33 |
| 2,297,046 | 9/1942 | Bourne. | |
| 2,936,041 | 5/1960 | Sharp et al. | 181—33 |
| 3,036,654 | 5/1962 | Powers | 181—54 |

FOREIGN PATENTS

| 707,697 | 6/1941 | Germany. |

ROBERT S. WARD, JR., *Primary Examiner.*